US012771456B1

(12) United States Patent
Wang et al.

(10) Patent No.: US 12,771,456 B1
(45) Date of Patent: Oct. 20, 2026

(54) APPARATUS AND METHOD OF CHANNEL SYNCHRONIZATION IN HIGH-SPEED TRANSMITTERS

(71) Applicant: MARVELL ASIA PTE LTD, Singapore (SG)

(72) Inventors: Linghsiao Wang, Irvine, CA (US); Espen Olsen, Irvine, CA (US); Liang Fan, Irvine, CA (US); Afshin Mellati, Irvine, CA (US); Quanli Lu, Irvine, CA (US); Cindra Abidin, Irvine, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 257 days.

(21) Appl. No.: 18/500,408

(22) Filed: Nov. 2, 2023

Related U.S. Application Data

(60) Provisional application No. 63/422,128, filed on Nov. 3, 2022.

(51) Int. Cl.

| | |
|---|---|
| ***H04B 10/50*** | (2013.01) |
| ***H04B 10/532*** | (2013.01) |
| *H04B 10/07* | (2013.01) |
| *H04B 10/61* | (2013.01) |
| *H04J 14/06* | (2006.01) |

(52) U.S. Cl.

CPC ........... *H04B 10/532* (2013.01); *H04B 10/07* (2013.01); *H04B 10/50* (2013.01); *H04B 10/5057* (2013.01); *H04B 10/614* (2013.01); *H04J 14/06* (2013.01)

(58) Field of Classification Search

CPC .... H04B 10/532; H04B 10/614; H04B 10/07; H04B 10/50; H04B 10/5057; H04J 14/06

USPC ......................... 398/9–38, 43–103, 182–201

See application file for complete search history.

(56) References Cited

U.S. PATENT DOCUMENTS

| | | | | |
|---|---|---|---|---|
| 8,699,880 | B2 * | 4/2014 | Grigoryan ............ | H04B 10/613 398/205 |
| 8,768,174 | B2 * | 7/2014 | Zeng .................... | H04B 10/548 398/72 |
| 11,223,421 | B1 * | 1/2022 | Xu ....................... | H04B 10/616 |
| 2009/0317090 | A1 * | 12/2009 | Conroy ................ | H04B 10/532 398/184 |
| 2010/0061731 | A1 * | 3/2010 | Conroy ................... | H04J 14/06 398/102 |
| 2011/0044702 | A1 * | 2/2011 | Mizuguchi .............. | H04J 14/06 398/184 |
| 2011/0229148 | A1 * | 9/2011 | Nishihara ........ | H04B 10/50572 398/183 |
| 2014/0169793 | A1 * | 6/2014 | Harley ................ | H04B 10/616 398/79 |

(Continued)

*Primary Examiner* — Dibson J Sanchez

(57) ABSTRACT

A high-speed driver for a coherent optical transmitter includes multiple channels, each channel configured to combine slices of an electrical signal into an orthogonal component of a coherent light signal to be transmitted by the coherent optical transmitter, a calibration loop configured to measure a respective latency of each of the slices of the electrical signal, and a plurality of programmable delays configured to receive the respective latency of each of the slices and compensate differences between the respective latencies of each of the slices by adjusting delays of the slices to combine outputs of the channels into a single wavelength of the coherent light signal to be transmitted by the coherent optical transmitter.

18 Claims, 8 Drawing Sheets

(56) References Cited

U.S. PATENT DOCUMENTS

| | | | | |
|---|---|---|---|---|
| 2015/0071642 | A1* | 3/2015 | Tanaka | H04B 10/548<br>398/115 |
| 2016/0191168 | A1* | 6/2016 | Huang | H04J 14/0298<br>398/45 |
| 2017/0070286 | A1* | 3/2017 | Nishihara | H04B 10/572 |
| 2018/0175941 | A1* | 6/2018 | Campos | H04B 10/532 |
| 2020/0162167 | A1* | 5/2020 | Hamaoka | H04B 10/616 |
| 2020/0252154 | A1* | 8/2020 | Wu | H04J 14/0298 |
| 2025/0233670 | A1* | 7/2025 | Hamaoka | H04J 14/02 |

* cited by examiner

APPARATUS AND METHOD OF CHANNEL SYNCHRONIZATION IN HIGH-SPEED TRANSMITTERS

CROSS-REFERENCE TO RELATED APPLICATIONS

This application claims the benefit of U.S. Provisional Application No. 63/422,128, filed on Nov. 3, 2022. The entire disclosures of the applications referenced above are incorporated herein by reference.

FIELD

The present disclosure relates generally to high-speed transmitters and more particularly to channel synchronization in high-speed transmitters.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The present invention relates to optical communication techniques. More particularly, the present invention provides an apparatus and method of channel synchronization in high-speed coherent optical transmitters.

Existing high speed coherent optical transmitters combine four electrical signals from four electrical channels into a single optical wavelength. Four electrical channels are merged onto one of a pair of orthogonal components of one optical symbol of a polarized light signal. Therefore, the four electrical signals must be delay-matched.

The high-speed electrical signal on a silicon-based semiconductor is typically generated by multiplexing in parallel cascaded driver slices at a slower speed in a time interleaved manner. Each slower driver slice may consist of a digital-to-analog converter (DAC) or an RZ/NRZ (return-to-zero or non-return-to-zero) driver. All of the parallel driver slices of a single electrical channel also need to be delay-matched to form an equivalent of a single highspeed channel.

An example cascaded driver for a coherent optical transmitter includes multiple (e.g., four) channels. Each channel includes four parallel driver slices separately receiving electrical signals in parallel states. A multiplexer combines these signals into one output to generate one orthogonal component in each channel to be combined into a coherent light signal, such as HI (horizontal in-phase component), HQ (horizontal quadrature component), VI (vertical in-phase component), and VQ (vertical quadrature component). For each channel, given that the electrical latency on each parallel driver slice to its output is matched sufficiently, the major source of the delay variation is an initial state of a parallel-to-serial (PS) conversion circuit. The high-speed data is typically generated from a digital control logic that is running on a much slower clock frequency. Multiple symbols (or data) are generated in parallel in each digital clock cycle. This parallel data in each of multiple slices is then serialized. If the initial state of the parallel-to-serial conversion circuit is different from slice to slice, the outputs at the cascaded driver will be shuffled from its original sequence. Parallel state indicates which symbol of the parallel bus will be sent to the driver slice for a given clock cycle. For example, a serialized signal in time-sequence output for generating an HI component is associated with a serialized sequence of respective slices.

To achieve the above synchronization, an architecturally simple technique is to share a common clocking circuit and a parallel-to-serial conversion circuit for each of the parallel driver slices. In practice, this is very difficult and power hungry due to physical spacing of multiple slices and the very high clock speed (e.g., tens of gigahertz (GHz)). An independent clocking circuit per parallel to serial circuit can be implemented to reduce complexity of the design. However, a synchronous reset scheme must be implemented to initialize a state of each clocking circuit. Implementation of a synchronous reset scheme at a very high clocking rate is very difficult and unreliable. Therefore, developing an improved technique for channel synchronization in high-speed coherent optical transmitters is desired.

SUMMARY

The present disclosure relates to optical communication techniques. More particularly, the present disclosure provides an apparatus and method of channel synchronization in high-speed coherent optical transmitters. Merely by example, the apparatus achieves the parallel-to-serial state synchronization with an observation loop added at each slice/channel output and gearboxes added per slice prior to the parallel-to-serial conversion circuit to compensate the latency variation in coherent optical transmitters for high-speed data communication applications, though other applications are possible.

A high-speed driver for a coherent optical transmitter includes multiple channels each configured to combine slices of an electrical signal into an orthogonal component of a coherent light signal to be transmitted by the coherent optical transmitter, an observation loop configured to measure a respective latency of each of the slices of the electrical signal, and a plurality of gearboxes configured to receive the respective latency of each of the slices and compensate differences between the respective latencies of each of the slices by adjusting delays of the slices.

In an embodiment, the present invention provides an apparatus for channel synchronization in a high-speed driver for coherent optical transmitter. The high-speed driver is cascaded by multiple channels. Each channel is configured to combine multiple electrical signals respectively through multiple parallel slices onto an orthogonal component of a coherent light signal to be transmitted by the coherent optical transmitter. The multiple parallel slices are coupled to a digital signal processor to respectively receive multiple parallel state signals merged into a parallel-to-serial conversion circuit to generate a serial state signal converted to an analog signal via a digital-to-analog converter (DAC).

The apparatus includes an observation loop coupled to an output of the DAC to select the analog signal composed of the parallel state signals from the multiple parallel slices and to subsample a slice symbol for a slice selected from the multiple parallel slices to measure a latency of the slice. Additionally, the apparatus includes two or more gearboxes, with a gearbox being disposed for each slice, the gearbox being coupled to the digital signal processor and the parallel-to-serial conversion circuit, and configured to receive latency of each slice and to compensate difference of latency of each slice by setting output delay of a corresponding parallel state signal in a corresponding slice to make all slice delays equal before merging into the parallel-to-serial conversion circuit.

Optionally, the observation loop includes an analog multiplexer coupled to outputs of the multiple channels to select the analog signal coming from four parallel slices of respective one channel.

Optionally, the observation loop further includes a low-speed analog-to-digital converter (ADC) coupled to an output of the analog multiplexer to sample the analog signal to generate an ADC sample. The ADC is clocked by a clock having a frequency that is equal to a slice clock frequency of the slice selected from the four parallel slices divided by a factor R, where R is rational multiple of the number of slices in the respective one channel.

Optionally, the observation loop further includes a latency calibrator configured to calibrate a latency variable l that matches a path delay of the slice symbol in the slice selected from the four parallel slices starting at an output of the DAC and ending with the ADC sample by a match filter in a control loop through multiple clock cycles defined by a variable r=nR−l, where n is a cycle sequential number.

Optionally, the control loop includes a subsample component for sampling the slice symbol to be input to the DAC with the slice clock frequency in multiple clock cycles, a ratio tracker to track the variable r to determine which slice symbol is valid based on accumulation of output of the match filter that matches the ADC sample and the slice symbol.

Optionally, the control loop further includes a delay component to match the path delay between the ADC sample and the slice symbol with the latency variable l being swept with a minimum step complimentary to the factor R with a fractional part to make the variable r an integer.

Optionally, the control loop further includes an accumulator to accumulate a set of/on each ADC sample and find a value of/associated with a maximum match filter value to be a latency of the slice over different parallel slices in different channels.

Optionally, the gearbox is configured to compensate a difference of latency of each slice to make all slice delays of corresponding slice symbols to be equal to achieve channel synchronization.

Optionally, the observation loop further includes a separate ADC for each channel and all ADCs are configured to sample one analog signal separately from each channel to output a respective ADC sample separately at a substantially same sampling time.

In another embodiment, the present invention provides a coherent optical module comprising a coherent optical transmitter having a high-speed driver comprising an apparatus described herein for channel synchronization. The high-speed driver is cascaded by multiple channels, each channel combining multiple electrical signals respectively through multiple parallel slices onto an orthogonal component of a coherent light signal to be transmitted by the coherent optical transmitter. The multiple parallel slices are coupled to a digital signal processor to respectively receive multiple parallel state signals with respective latency delays synchronized before being merged into a parallel-to-serial conversion circuit to generate a serial state signal converted to an analog signal via a digital-to-analog converter (DAC) for generating an optical symbol per channel.

Optionally, the coherent optical module further includes a phase rotator in a control loop to adjust clock phase to each channel for further matching channel latency all the way from electrical signal path to the coherent optical transmitter to compensate module-level mismatch.

In yet another embodiment, the present invention provides a method for channel synchronization in a high-speed driver for coherent optical transmitter. The high-speed driver is cascaded by multiple channels, each channel combining multiple electrical signals respectively through multiple parallel slices onto an orthogonal component of a coherent light signal to be transmitted by the coherent optical transmitter. The multiple parallel slices are coupled to a digital signal processor to respectively receive multiple parallel state signals merged into a parallel-to-serial conversion circuit to generate a serial state signal converted to an analog signal via a digital-to-analog converter (DAC). The method includes a step of outputting the analog signal originated from the multiple parallel slices of one of the multiple channels. The method further includes a step of selecting the analog signal from an output of the DAC to an observation loop. Additionally, the method includes a step of sampling the analog signal by an analog-to-digital converter (ADC) in the observation loop to obtain an ADC sample in multiple clock cycles with a frequency being that is equal to a slice clock frequency in the corresponding one of the multiple parallel slices divided by a factor R. The method further includes subsampling a slice symbol to be inputted to the DAC from a slice selected from the multiple parallel slices of one of the multiple channels in the multiple clock cycles. Furthermore, the method includes a step of tracking a variable r=nR−l through every clock cycle n of the multiple clock cycles, wherein/is a latency variable. The method further includes matching the latency variable l with a path delay in the one of the multiple parallel slices starting with the slice symbol at the output of the DAC and ending with the ADC sample. Moreover, the method includes determining a latency of each slice and compensating difference of latency among different slices to achieve channel synchronization in each of the multiple channels.

Optionally, the step of selecting the analog signal includes using a low-speed analog multiplexer coupled to outputs of the multiple channels to select the analog signal from the multiple parallel slices of respective one channel.

Optionally, the step of sampling the analog signal includes using one ADC at an output of the low-speed analog multiplexer. The one ADC samples the analog signal from the multiple parallel slices of the respective one channel.

Optionally, the step of sampling the analog signal includes using multiple ADCs separately for the multiple channels. The multiple ADCs are configured to form a uniform observation point so that all ADCs are able to sample separate analog signals from different slices of different channels.

Optionally, the step of subsampling the slice symbol is executed to obtain the slice symbol out of the digital signal processor with a same slice clock frequency by a subsample component in a control loop before the slice symbol being sent to a gearbox in the slice selected from the multiple parallel slices.

Optionally, the step of tracking the variable r=nR−l includes determining which slice symbol subsampled by the subsample component is valid for a match filter accumulation that matches the ADC sample and the slice symbol for the slice selected from the multiple parallel slices.

Optionally, the step of matching the latency variable l with a path delay includes sweeping every value of the latency variable l by a delay component in the control loop with a minimum step that is complimentary to the factor R with a fractional part to make the variable r an integer.

Optionally, the step of determining the latency of each slice includes finding a value of/associated with a maximum result through a match filter accumulation with a location information of the selected slice in one of the multiple channels that matches the ADC sample and the slice symbol.

Optionally, the step of compensating a difference of latency among different slices comprises adjusting digital delay pipeline in a gearbox in each slice in one of the multiple channels based on the latency of each slice.

The present disclosure achieves these benefits and others in the context of coherent optical transmitter technology. However, a further understanding of the nature and advantages of the present disclosure may be realized by reference to the latter portions of the specification and attached drawings.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

It is also noted that the examples and embodiments described herein are for illustrative purposes only and that various modifications or changes in light thereof will be suggested to persons skilled in the art and are to be included within the spirit and purview of this process and scope of the appended claims.

In the drawings, reference numbers may be reused to identify similar and/or identical elements.

DETAILED DESCRIPTION

Merely by example, the apparatus described herein achieves parallel-to-serial state synchronization using an observation loop added at each slice/channel output of a cascaded driver and gearboxes added per slice prior to the parallel-to-serial conversion circuit to compensate the latency variation in coherent optical transmitter for high-speed data communication applications. In an aspect, the present disclosure provides an apparatus for channel synchronization in a high-speed driver of a coherent optical transmitter. The present disclosure also provides various designs for high-speed digital to analog converters.

Figure 1:
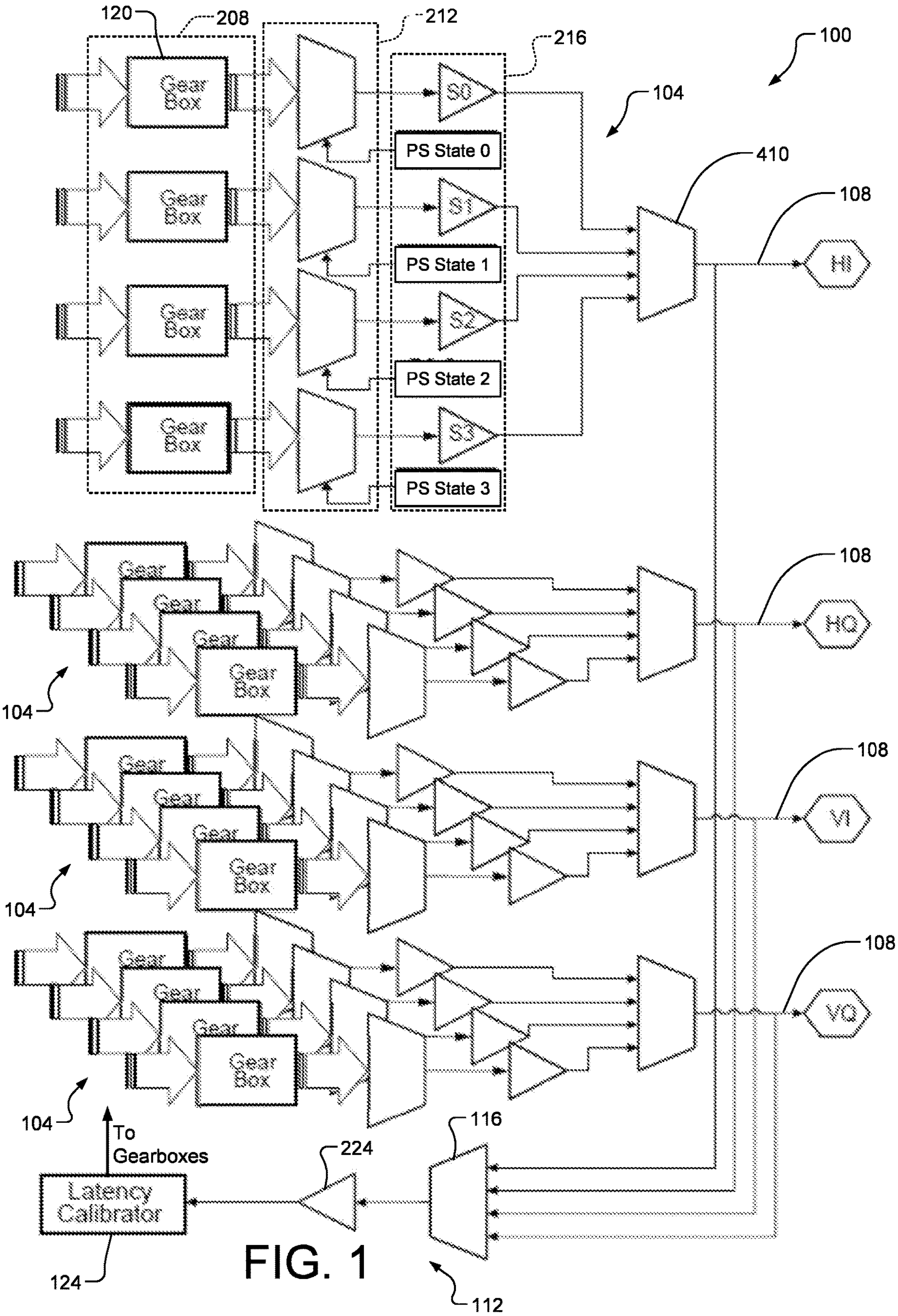
FIG. 1 is a simplified diagram of a high-speed driver for coherent optical transmitters with channel synchronization for combining four electrical signals from four channels into a single optical wavelength according to an embodiment of the present disclosure.

FIG. 1 is a simplified diagram of a high-speed cascaded driver 100 for coherent optical transmitter with an apparatus for channel synchronization according to an embodiment of the present disclosure. Reference numbers shown in FIG. 1 but not called out in the description of FIG. 1 are shown and described in further detail with reference to subsequent figures. In an embodiment, the apparatus for channel synchronization comprises the high-speed cascaded driver 100 for converting electrical signals (e.g., output by a digital signal processor (DSP) 204 shown in FIG. 2) to two pairs of orthogonal components HI, HQ, VI, VQ with both in-phase and quadrature modulation states of a coherent optical signal. The cascaded driver 100 includes multiple (e.g., four) channels 104 that receive digital data from a digital signal processor (DSP) 204 shown in FIG. 2. Each channel is configured to respectively convert multiple electrical signals from multiple parallel slices merged into one output 108 for forming one orthogonal component of a coherent light signal. Optionally, each channel is configured with four parallel slices, S0 (slice 0), S1 (slice 1), S2 (slice 2), S3 (slice 3) based on respective parallel states (PS) 0, 1, 2, 3, fed into a parallel-to-serial conversion circuit (shown in FIG. 2) to achieve parallel-to-serial state synchronization to create one serial state signal for one of the HI, HQ, VI, VQ orthogonal components in a respective channel. All of the orthogonal components in these channels are combined (e.g., by a combiner 410) into one wavelength of a coherent light signal that is transmitted by the coherent optical transmitter.

Optionally, the cascaded driver 100 includes a digital-to-analog converter (DAC) (shown at 216 in FIGS. 1 and 2) after the parallel-to-serial conversion circuit (shown at 212 in FIGS. 1 and 2) to generate a DAC symbol based on the serial state signal per channel. Additionally, the apparatus includes a latency monitor, such as a latency observation loop 112 coupled to slice/channel outputs of each channel of the cascaded driver 100. The latency observation loop 112 includes a multiplexer 116, which in some embodiments is of simple low-speed analog design, to select one analog signal from one slice output to observe. The analog signal is an output of the digital-to-analog converter (DAC) downstream of the parallel-to-serial conversion circuit, i.e., the serial state signal based on a serial sequence of the merged parallel states. The analog signal is then sampled (or converted to a sequence of digital values) by a low-speed and low-accuracy analog-to-digital-converter (ADC) (shown at 224 in FIGS. 1 and 2). Optionally, the sampling rate (or frequency) is equal to the slice signal frequency divided by the factor R. The selected analog signal is composed of outputs from four slices as shown in FIG. 1.

The apparatus further includes a gearbox 120 at the input of each slice of the channel 104 prior to the parallel-to-serial conversion circuit. The gearbox 120 is configured to receive information of about a difference of latency of the particular slice relative to others and to make compensation to the difference of latency before sending the synchronized parallel state signals to the parallel-to-serial conversion circuit.

Additionally, the latency observation loop 112 is configured with a latency calibrator 124 to measure the latency of each individual slice. For example, the latency observation loop 112 continuously or periodically measures and updates the latencies in a real-time manner. In an embodiment, the latency calibrator 124 includes a match filter (seen in the form of accumulator 240 in FIG. 2) configured to match the ADC sample (converted from an analog output of a digital-to-analog converter (DAC) from an electrical signal in the corresponding slice) and the slice symbol (a parallel state signal shown in FIG. 1) for a selected slice before it is tuned by the gearbox 120 in the corresponding slice.

Figure 2:
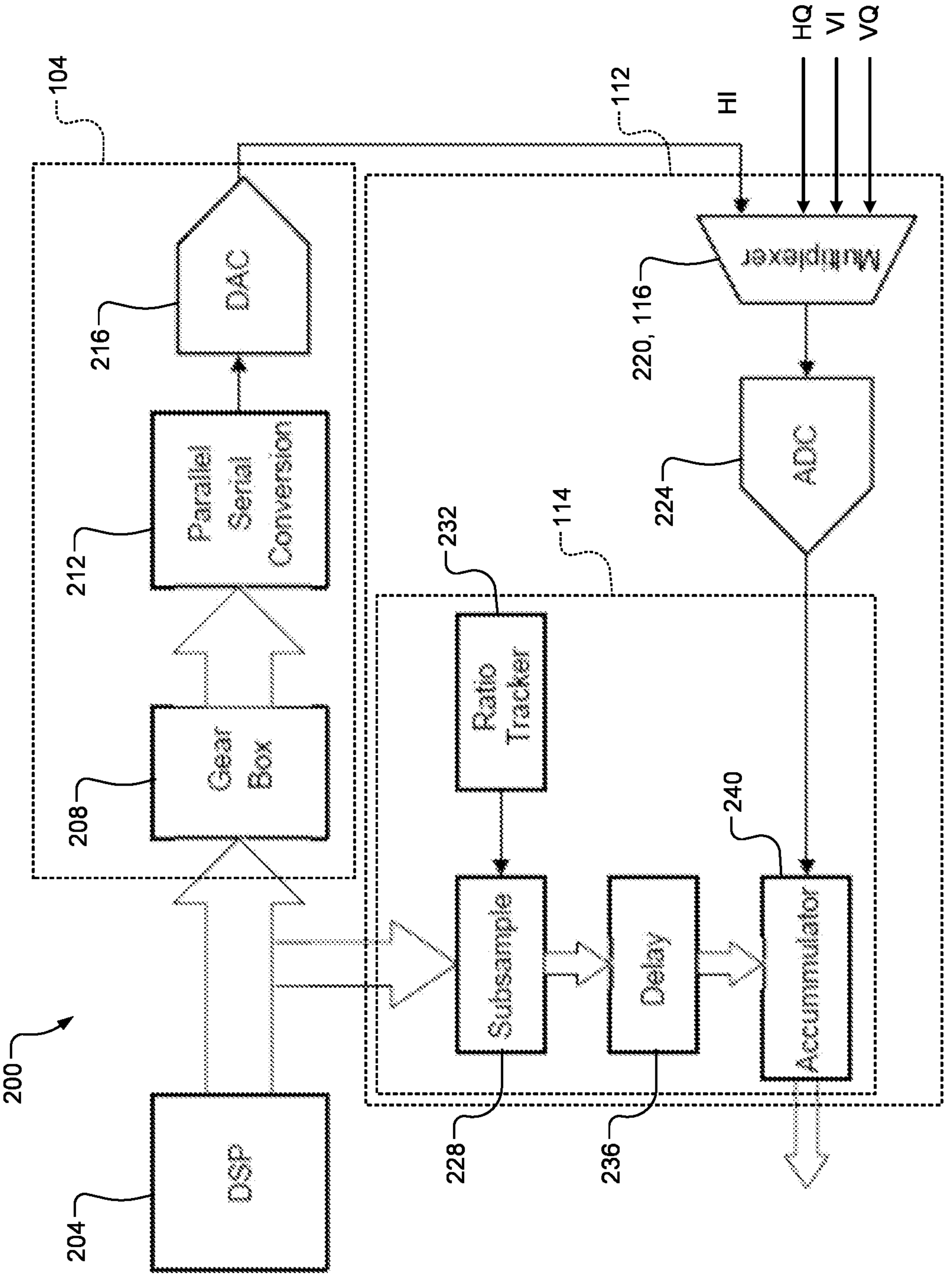
FIG. 2 is a block diagram of a control loop for channel synchronization in the high-speed driver for coherent optical transmitters according to an embodiment of the present disclosure.

In an embodiment of the latency calibrator 124 shown in FIGS. 1 and 2, the match filter operates according to an equation such as:

$$m_{c,s}(l) = \sum_{n}^{N} (adc(n) \cdot dac_{c,s}(nR - l))$$

where $$R = \text{frequency Ratio from } DAC \text{ to } ADC$$

$$l = \text{latency in symbols from } DAC \text{ to } ADC$$

$$c = \text{selected cascaded driver channel}$$

$$s = \text{selected } DAC \text{ slice of a cascaded driver}$$

$$S = \text{Number of slices for a driver}$$

$$dac_{c,s}(r) = \begin{cases} dac_c(r), & (r \bmod S) = s \\ 0, & \text{Otherwise} \end{cases}$$

$$dac_c(r) = DAC \text{ symbol of cycle } r \text{ on driver } c$$

$$adc(n) = ADC \text{ sample of cycle } n.$$

Without loss of generalization, the equation above assumes the DAC is a N-level driver (such as QAM-N) instead of an RZ/NRZ driver (2-level driver). This disclosure is applicable for both N-level drivers as well as 2-level drivers.

In the embodiment, for measuring the latency, the variable r=(nR−l) is provided for matching the ADC sample and the slice symbol, where clock cycle n must be an integer. Here, R is the ratio of the DAC frequency to the ADC frequency and l is a variable representing the latency of the slice. Therefore, if the ratio R has a fractional part of 0.5, latency l will be in a step of 0.5. The step size is one DAC sample. When the variable l matches the path delay from the DAC to the ADC for a given slice, the accumulated match number will reach peak value. In the embodiment, the latency calibrator 124 is configured to measure a location of peak $m_{c,s}$ for each slice (s) at one cascaded channel (c). The difference of latency per slice is compensated by the gearbox 120 in the corresponding slice before the slice symbols are sent to the parallel-to-serial conversion circuit.

FIG. 2 shows a block diagram of a control loop 200 for channel synchronization in a high-speed driver for coherent optical transmitters according to an embodiment of the present disclosure. In an embodiment, the control loop 200 for channel synchronization is an example high level implementation of the observation loop 112 in the apparatus for channel synchronization associated with the cascaded driver 100 shown in FIG. 1. As shown, the control loop 200 starts with a digital signal processor (DSP) 204 to process the digitized format associated with the electrical signal in each parallel slice before sending a slice symbol to the gearbox 208 of the slice. The slice symbol (with a latency compensation processed by the gearbox 208, to be described in more detail below) is provided for parallel-to-serial conversion to a parallel serial conversion circuit 212. Then, the output of the parallel-to-serial conversion circuit 212 is input in a digital-to-analog converter (DAC) 216 that outputs an analog signal associated one channel of the cascaded driver 100. This analog signal, as well as other analog signal from all other channels, can be selected by a multiplexer 220 to feed into a low-speed analog-to-digital converter (ADC) 224 which samples the analog signal selected from the respective channel coming from corresponding parallel slice to provide an ADC sample for measuring the latency thereof.

In an embodiment, the control loop 200 includes, as part of the match filter between ADC and DAC, a subsample component 228 used to identify the slice symbol associated with a particular channel c of the cascaded driver 100 in a particular cycle n with a variable r=(nR−l). The control loop 200 further includes a ratio tracker 232 connected to the ADC and the DAC, also as part of the match filter, to track the ratio R of the DAC frequency to the ADC frequency and to track the variable r=(nR−l) for every clock cycle to determine which DAC symbol (from the observation loop 112) is valid for match filter accumulation. The variable 'r' is initialized to (−I) and increased by R for every ADC sample when variable 'n' is increased by 1. The control loop 200 then uses a delay component 236 to match a path delay between the DAC symbol and the ADC sample from the loop 200 to find the latency l. The control loop 200 is also referred to as the DAC control loop 200. Finally, the DAC control loop 200 includes an accumulator 240 to measure the location of the match filter output peak $m_{c,s}$ for each parallel slice, which determines a difference of latency per slice as an output of the latency calibrator 124 that is fed back to the digital signal processor 204.

Optionally, to find the latency, the DAC control loop 200 sweeps the variable l (in the variable r) and finds the value associated with the maximum value of the match filter output peak $m_{c,s}$ corresponding to a particular DAC slice which yields a latency of the corresponding slice. Once the latency of each slice is found by the accumulator 240, the difference is collected as an output of the latency calibrator 124 and is fed back to digital signal processor 204. The latency difference for the DAC symbols from the DSP 204 is compensated by the gearboxes associated with respective slice/channel. For instance, if the slice 0 has latency of 250 and slice 1 has latency of 256, the gearbox of slice 0 is set to delay the output symbol by 6 to make all slice delays equal to 256.

Optionally, the operation to run the apparatus (the cascaded driver 100 of FIG. 1) with the DAC control loop 200 (FIG. 2) to measure and to adjust latency can be performed in a background mode (during mission mode) or foreground mode (prior to mission mode). If this operation is performed in foreground, the observation path of the DAC symbol can be turned off to minimize its power and noise.

In the embodiment, the computations associated with the match filter of the observation loop 112 in multiple clock cycles provide the signal-to-noise ratio (SNR) as proportional to VN. The match filter peak can be distinguished by accumulating the data described above in the accumulator 240 over several number of cycles. Sweeping a range of variable l can take time at system startup. To speed up the startup process, three optional trade-offs can be made, 1) to speed up the ADC sample speed, 2) to accumulate for a set of variable l on each ADC sample, or 3) to have a separate ADC for each channel of the cascaded driver 100. All these approaches will increase power or area of the apparatus. The first two options are straight forward. In option 3), the ADCs need to be implemented so as to form a uniform observation point. All ADCs need to sample at nearly the same time. The sampling time variation will contribute to the observation error.

In an example, assuming the path from each channel output of the cascaded driver 100 to ADC is matched in an implementation with a response G, and letting the response from a DAC of a parallel slice to the channel output of the cascaded driver 100 be $H_s$, then response from the DAC to ADC will be $GH_s$. The signal arriving at the ADC 224 will be $$\sum_s^S DAC_s GH_s.$$

in the time domain, the ADC sample out of the DAC output symbols are given:

$$adc(n) = \sum_s \sum_t dac_s(n-t) \cdot gh_s(t)$$

$$dac_s(r) = \begin{cases} dac(r), & (r \bmod S) = s \\ 0, & \text{Otherwise} \end{cases}.$$

Let t=t'S+n−s, where S is number of slices for a channel, n is the cycle's sequential number, and s is a selected slice of the cascaded driver 100. Then, the ADC sample becomes:

$$adc(n) = \Sigma_s \Sigma_{t'} dac(s-t'S) \cdot gh_s(t'S+n-s).$$

Assuming the DAC output symbols dac(r) are not correlated, its expected value is given as:

$$E[d(i)] = \lim_{N\to\infty} \frac{\sum_n^N dac(n)dac(n+i)}{N} = \begin{cases} E[dac^2], & i = 0 \\ 0, & \text{Otherwise} \end{cases}.$$

The match filter between ADC and DAC under this condition will be given as:

$$m(l) = \sum_n^N (adc(n) \cdot dac(n-l)) = \sum_n^N \left( dac(n-l) \sum_s \sum_{t'} dac(s-t'S) \cdot gh_s(t'S+n-s) \right) = \sum_s \sum_{t'} \sum_n^N dac(n-l) \cdot dac(s-t'S) \cdot gh_s(t'S+n-s).$$

The expected value of match filter is given as:

$$E[m(l)] = \frac{N}{S} \cdot E[dac^2] \cdot \sum_s gh_s(l) E[m(l)] = \frac{N}{S} \cdot E[dac^2] \cdot \sum_s gh_s(-l).$$

Optionally, replacing n with n'S+s+l, that is at interval of S, it defines a partial match filter associated with each slice s as following equation:

$$m_s(l) = \sum_{n'}^N (adc(n'S+s+l) \cdot dac(n'S+s)) = \sum_{s'} \sum_{t'} \sum_{n'}^N dac(n'S+s) \cdot dac(s'-t'S) \cdot gh_{s'}(t'S+n'S+s-s'+l)$$

The expected value is given as:

$$E[m(l)] = N \cdot E[dac^2] \cdot gh_s(l),\ E[m(l)] = \frac{\sum_s E[m_s(l)]}{S}.$$

From the equation, we can extract the path response from each slice DAC symbol to the ADC sample by matching the selected ADC sample and a DAC input. On the DAC side, the selected DAC input is the DAC symbols to the selected slice, which is self-postulating because the slice response will only be related to the symbols for this slice.

Note that all the previous equations have the DAC symbol generated at the same rate as the cascaded driver frequency. Since the ADC 224 is sampled at a frequency that is equal to R the cascaded driver frequency divided by the factor R, the ADC sample is only valid when (n'S+s+1 mod R)=0 (n'S+s−1 mod R)=0, meaning the (n'S+s+I) (n'S+s−1 is in integer multiple of R. If R is integer multiple of S, $m_s$(l) will only have value when (l mod S)=s (i.e., when l is in integer multiple of S).

The apparatus for channel synchronization described in FIG. 1 can have the factor R expressed as a fractional number. If R has a fractional part of 0.5, the l will be in steps of 0.5 DAC sample that generates half UI response from $m_s$(l). The condition (n'S+s+l mod R)=0 (n'S+s−l mod R)=0, (n'S+s−l mod R)=0 means the (n'S+s−l (n'S+s+l) is in integer multiple of R.

Optionally, for the slices in a channel of the cascaded driver 100, the difference of response is caused by mismatches among the DACs (e.g., transistor or wire impedance mismatches). The DAC control loop 200 (FIG. 2) will use the obtained responses to tune the analog signal controls such as latency as described above and make the $GH_s$ equal for all slices of the channel. Since the response G is shared, $H_s$ is matching among all the slices and the cascaded driver 100 operates as a fast DAC.

The difference of cascaded driver output timing for different channels can be measured from the response as well. From the measured discrete response H, the continuous response h can be obtained by interpolating. The output phase of the cascaded driver is defined as T such that h(T)=max(h)/2 and h(T+ε)>h(T). Only a pre-cursor slope of the cascaded driver output response h is used to determine the phase since typically pre-cursor slope is less impacted by factors such as variations in power supply and temperature during runtime (i.e., during operation).

In an example of a coherent optical system/module configured with a coherent optical transmitter and the high-speed driver with channel synchronization according to the present disclosure, a clock supplied to each slice can be adjusted by a phase rotator (not shown) for module level latency matching. For example, a clock phase rotator is used to shift a clock edge of the clock supplied to each slice. Since the DAC is driven by clock cycles, moving the clock edge moves the sample that is driven out of the DAC for the clock cycle. Optionally, the DAC control loop 200 (FIG. 2) can adjust this phase rotator to make the output phase of each high-speed driver at the target phase $T_t$.

The requirement of matching the channel latency all the way is applied to the coherent optical transmitter. The electrical signal path may not be matched perfectly at the module level. The high-speed driver output phase adjustment capability can be used to compensate this module level mismatch. At the module level, DAC output is delivered to final point through wire traces/amplifier stages and every stage may contribute certain amount of latency difference. This adjustment can be used to compensate the variation outside of the chip.

Optionally, during a system/module calibration, a pre-calibrated optical receiver is connected to the corresponding optical transmitter therein. In a calibration loop the output phase $T_t$ of each driver is tuned to achieve the best optical eye opening. At the change of target $T_t$, the DAC control loop 200 associated with the advanced high-speed driver will automatically rotate the clock of the driver with feed-back from the measurement of responses. Once the optimum $T_r$ for each channel is found, the value is saved in non-volatile memory for this module and is used each time the coherent optical system/module is powered up for operation or use in an application.

In an alternative embodiment, if the DAC traffic is filtered such that the consecutive DAC symbols are related, the match filter result will be given as:

$$E[m_s(l)] = N \cdot \sum_{i,s'=(s-i) \bmod S} E[d(i)] \cdot gh_{s'}(i+l).$$

The match filter result for each slice s is mixed with responses from other slices, and blurs the response measurement. For this reason, the initial calibration must be done with a replaced DAC symbol sequence that has zero auto-correlation. Assuming the response is tuned to be very well matched, the calibration can continue with lowered gain after being switched back to correlated live DAC traffic.

In yet another aspect, the present disclosure provides a method for channel synchronization in a high-speed driver for coherent optical transmitters. The high-speed driver (as shown in FIG. 1) is cascaded by multiple channels (the cascaded driver 100). Each channel is configured to combine multiple electrical signals respectively through multiple parallel slices onto an orthogonal component (such as HI, VI, or VQ) of a coherent light signal to be transmitted by the coherent optical transmitter. The multiple parallel slices are coupled to a digital signal processor to respectively receive multiple parallel state electrical signals merged into a parallel-to-serial conversion circuit to generate a serial state signal converted to an analog signal via a digital-to-analog converter (DAC).

Figure 3:
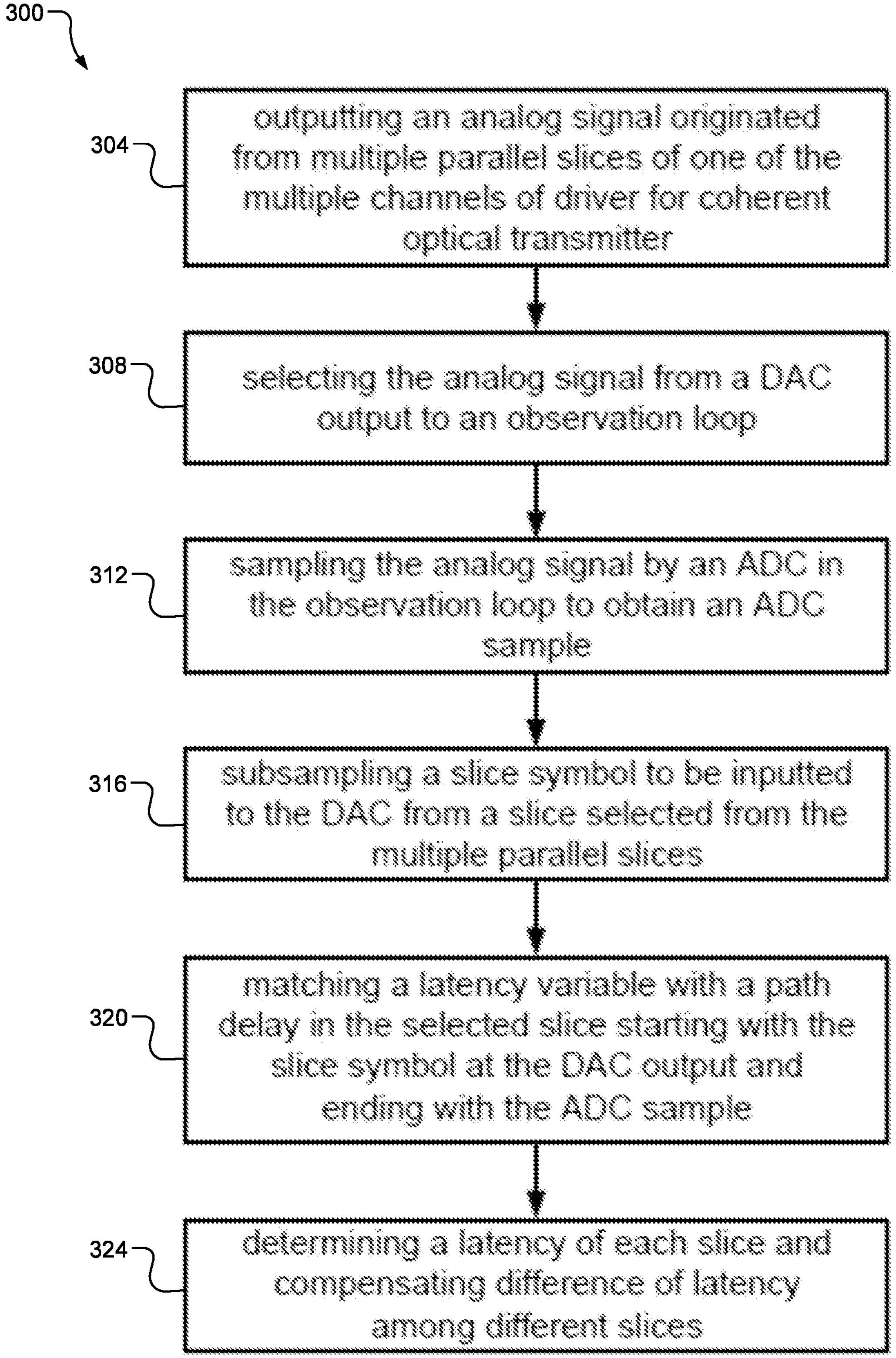
FIG. 3 is a flow chart showing a method of channel synchronization in high-speed coherent optical transmitters according to an embodiment of the present disclosure.

FIG. 3 shows a flow chart of a method 300 for channel synchronization in a high-speed driver for coherent optical transmitters according to an embodiment of the present disclosure. This diagram is merely an example. As shown, the method 300 includes a step 304 of outputting an analog signal originating from multiple parallel slices of one of the multiple channels of a high-speed driver for coherent optical transmitter. Each channel is a cascaded driver configured to convert multiple parallel state electrical signal to a serial state signal for forming one orthogonal component (such as an HI component) of a coherent light signal to be transmitted by the coherent optical transmitter.

The method 300 for channel synchronization further includes a step 308 of selecting the analog signal from a DAC output to an observation loop. The analog signal is an output of a DAC at each channel output. Additionally, the step 308 is executed by employing a low-speed analog multiplexer to select the analog signal from one slice to observe in the observation loop, which is part of an apparatus in the high-speed driver configured to achieve channel synchronization for transmitting respective parallel state electrical signals from a digital signal processor through paths associated with the multiple parallel slices.

The method 300 for channel synchronization further includes a step 312 of sampling the analog signal by an analog-to-digital converter (ADC) in the observation loop to obtain an ADC sample for measuring latency of an individual slice. Optionally, the ADC is coupled to an output of the analog multiplexer and is configured to selectively sample the signal from either one of the multiple channels. The selected signal comprises outputs from all parallel slices (of a channel) as shown in FIG. 1. Optionally, the ADC is clocked by dividing the slice clock frequency with a factor R. Optionally, the obtained ADC sample is calibrated by a latency calibrator in the observation loop which comprises a match filter to match the ADC sample and a slice symbol subsampled from a selected slice before making a compensation to any difference of latency in each of all slices by a gearbox disposed in the respective slice. Optionally, multiple ADCs are used separately for the multiple channels to respectively sample the analog signals from different channels. In this case, the multiple ADCs are configured to form a uniform observation point so that all ADCs are able to sample separate analog signals from different slices of different channels substantially at a same time or as close as possible in time.

Additionally, the method 300 for channel synchronization includes a step 316 of subsampling a slice symbol to be inputted to the DAC from a slice selected from the multiple parallel slices. As mentioned above, this step can be executed by a DAC control loop to subsample the slice symbol according to the same slice clock frequency after it is output from the digital signal processor before it is forwarded to the gearbox in the slice (and before it is input to the DAC in that channel). Optionally, the DAC control loop includes a subsample component coupled to the output of the digital signal processor to obtain the slice symbol. Optionally, the slice symbol, as it is input to the DAC, is also called a DAC symbol. An output of the DAC is used as a starting point for measuring a path delay of the slice symbol to an ending point where the analog signal is sampled by the ADC.

The method 300 for channel synchronization includes a step 320 of matching a latency variable with the path delay in the selected slice starting with the slice symbol at the DAC output and ending with the ADC sample. Optionally, before this step, a step (not shown) of tracking a variable $r=nR-l$ is executed by a ratio tracker in the DAC control loop to determine which slice symbol subsampled by the subsample component is valid for a match filter accumulation that matches the ADC sample and the slice symbol for the slice selected from the multiple parallel slices. Optionally, the step 320 of matching the latency with the path delay includes sweeping every value of the latency variable l by a delay component in the DAC control loop with a minimum step that is complimentary to the factor R with a fractional part to make the variable r an integer.

The method 300 of channel synchronization includes a step 324 of determining a latency of each slice and compensating difference of latency among different slices of one of the multiple channels each being a cascaded driver. Optionally, the step 324 includes finding a value of the latency variable associated with a maximum result through the match filter accumulation with a location information of the selected slice in one of the multiple channels that matches the ADC sample and the slice symbol. Optionally, an accumulator in the DAC control loop is used to accumulate a set of/on each ADC sample and find a value of/associated with a maximum match filter value to be a latency of the slice over different parallel slices in different channels. Once the latency of each slice is found, the difference is compensated by the gearbox in each slice. For instance, if the slice 0 has latency of 250 and slice 1 has latency of 256, the gearbox of slice 0 is set to delay the output symbol by 6 to make all slice delays equal to 256.

The techniques described above are applicable not only to optical communications but also to any high-speed digital to analog conversion system where a DSP provides a large number of samples (groups of bits) that are converted into a high-speed analog signal. In the high-speed digital to analog conversion system, samples from the DSP are split into multiple parallel channels. Each channel comprises a set of parallel to serial (PS) converters connected to a set of digital to analog converters (DACs). In a channel, the PS converters convert portions of the samples received from the DSP into multiple serial data streams that are input to the DACs. For example, each PS converter functions as a multiplexer that receives several samples from the DSP and that outputs one sample (e.g., a group of bits) at a time in a serial manner. The output of the PS converter is called serial data stream (i.e., a group of bits of a sample output at the same time). In the channel, the DACs convert the outputs of the respective PS converters. Outputs of the DACs in the channel are combined by a combiner to generate an analog signal representing the samples processed by the channel. If the high-speed digital to analog conversion system is used to generate a coherent optical signal as described above with reference to FIG. 1, the high-speed digital to analog conversion system will include four channels that will respectively output the HI, HQ, VI, and VQ signals shown in FIG. 1, and the outputs of all the channels are combined by another combiner to generate a coherent light signal representing the samples output by the DSP.

To ensure that the analog signal is a faithful representation of the samples output by the DSP, the PS converters in each channel need to be synchronized so that the DACs in each channel convert the outputs of the PS converters synchronously. Traditionally, this synchronization is achieved using a common reset signal input to all PS converters in the same channel. However, this reset scheme requires additional hardware in the ultra-high-speed DAC due to shrinking symbol period. Without the synchronizing reset signal, when the system is powered up, the PS converters will power up with different temporal starting points and will require extra steps to remove the temporal variations for their synchronization.

Therefore, in the present disclosure, the synchronization of the PS converters is achieved by employing a programmable delay (also called a gearbox) at the input of each PS converter in each channel. Specifically, in each channel, a programmable delay is employed between the DSP and each PS converter. The programmable delays are controlled using a control loop to adjust the timing of the samples input to the PS converters. Specifically, as explained below in detail, a programmable delay receives samples from the DSP and outputs the samples to the PS converter with the timing of the samples adjusted such that the PS converter outputs all bits of a sample to the DAC at the same time. Once the PS converters output the samples synchronously, the corresponding DACs receive and convert the outputs of the PS converters synchronously. Consequently, the analog signal generated by combining the outputs of the DACs in a channel faithfully represents the samples processed by the channel. By similarly synchronizing the PS converters in all the channels using the programmable delays, the analog signal generated by combining the outputs of all the channels faithfully represents the samples output by the DSP. Thus, the programmable delays, the PS converters, the DACs, and the combiner in all the channels and another combiner that combines the outputs of all the channels function as one high-speed DAC that converts the large number of samples output by the DSP into an analog signal that faithfully represents the samples output by the DSP.

Figure 4A:
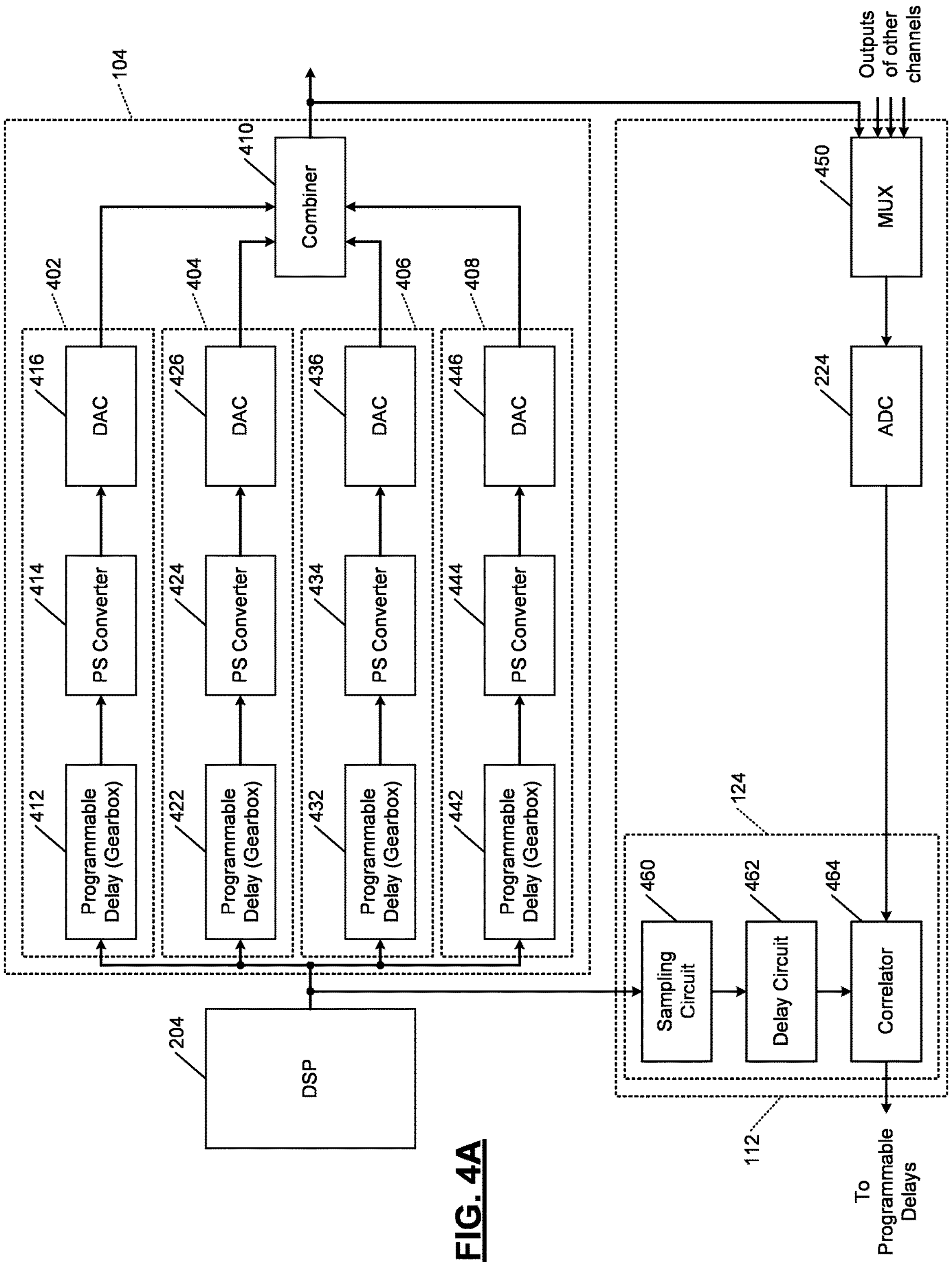
FIGS. 4A-4D show various configurations of a high-speed digital to analog converter (DAC) according to the present disclosure.
Figure 4B:
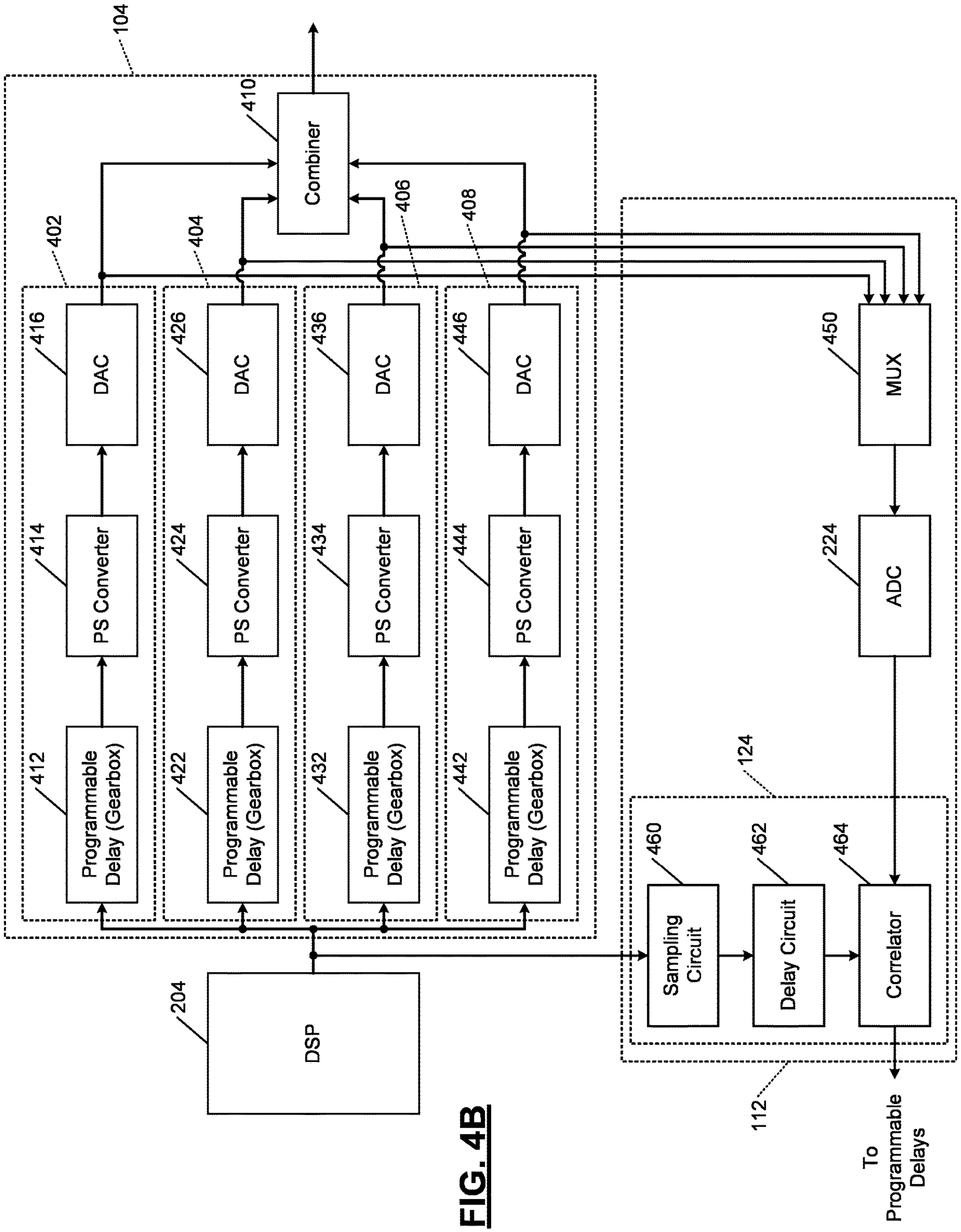
Figure 4C:
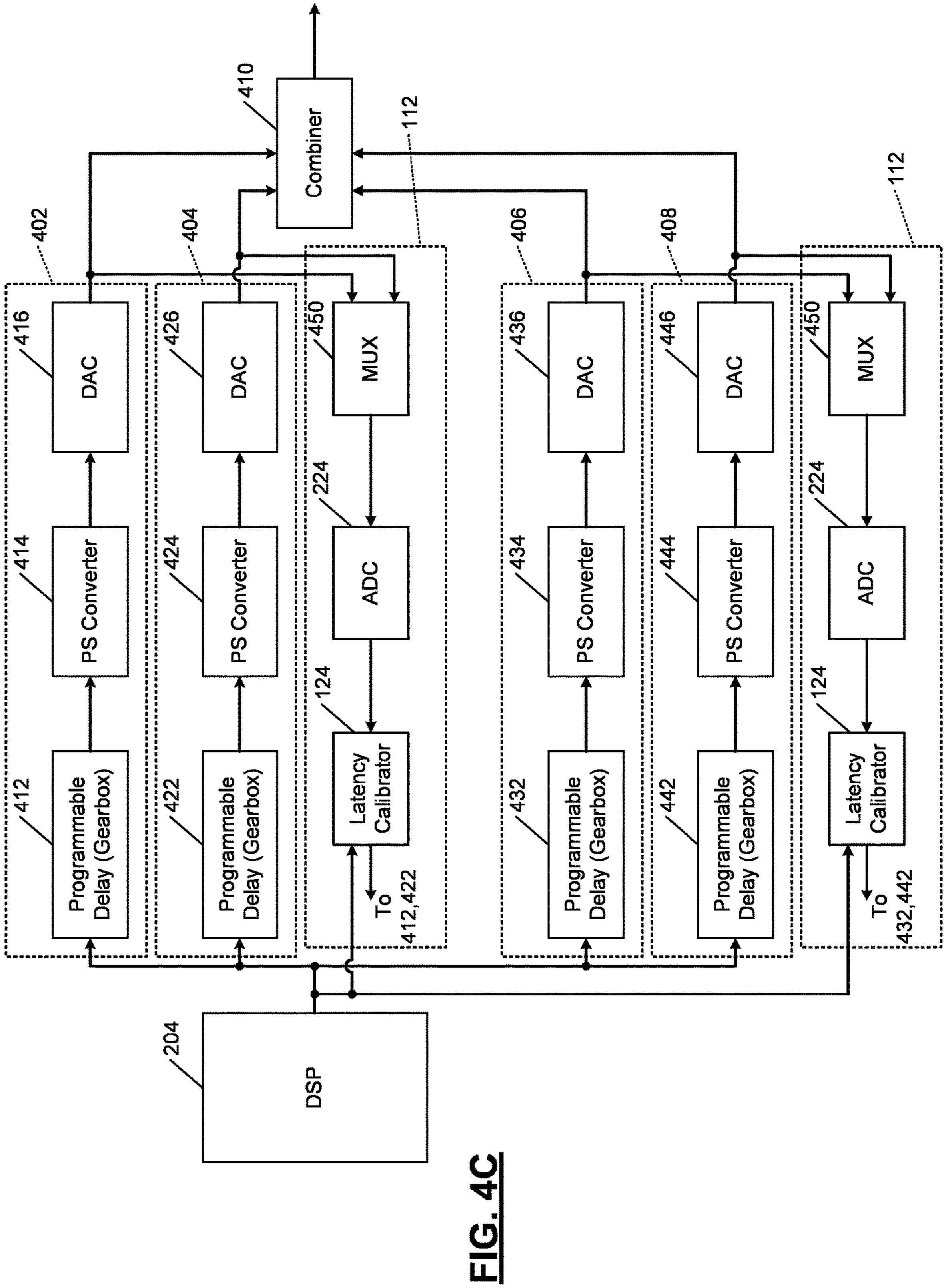
Figure 4D:
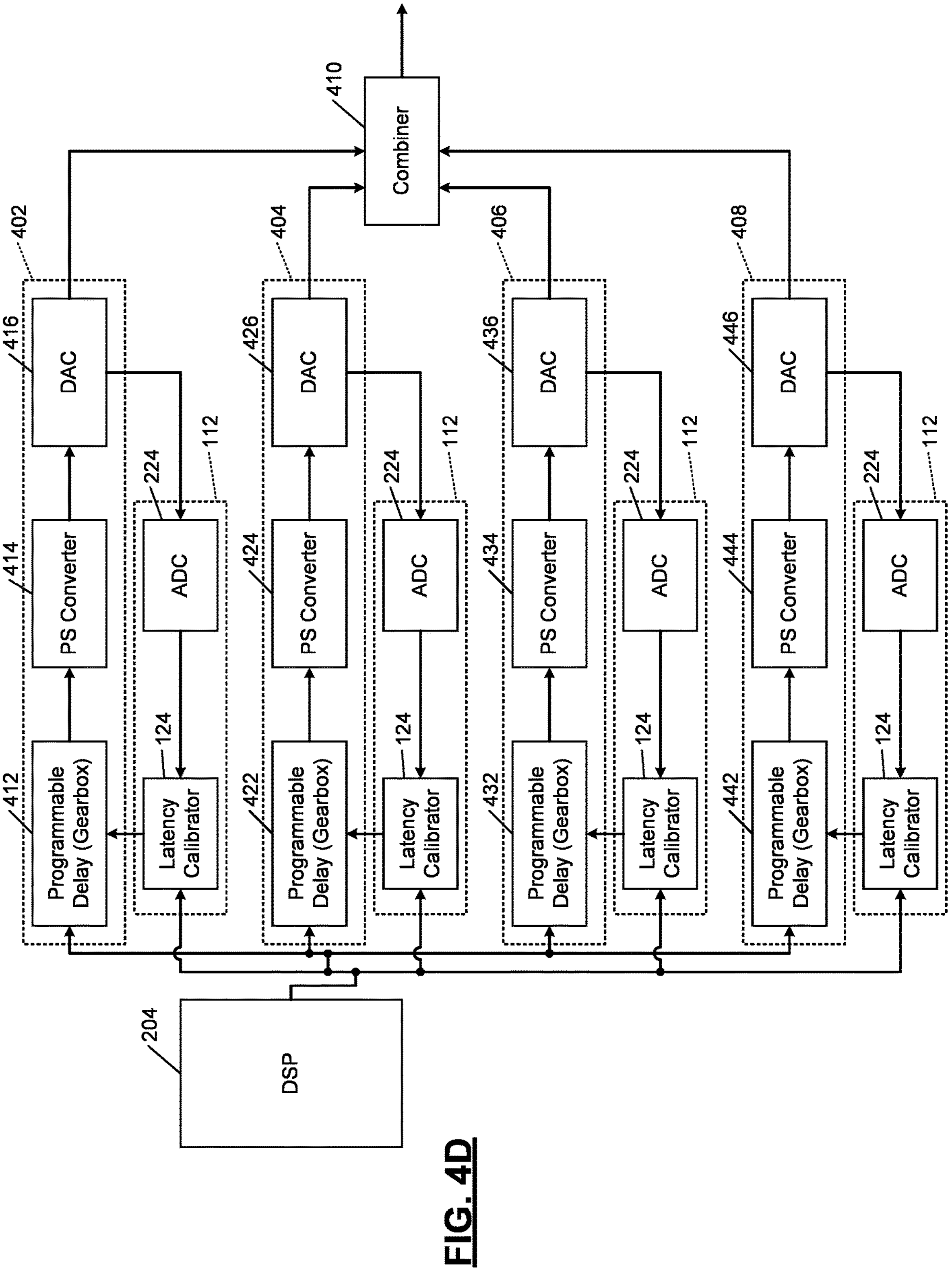
Figure 6:
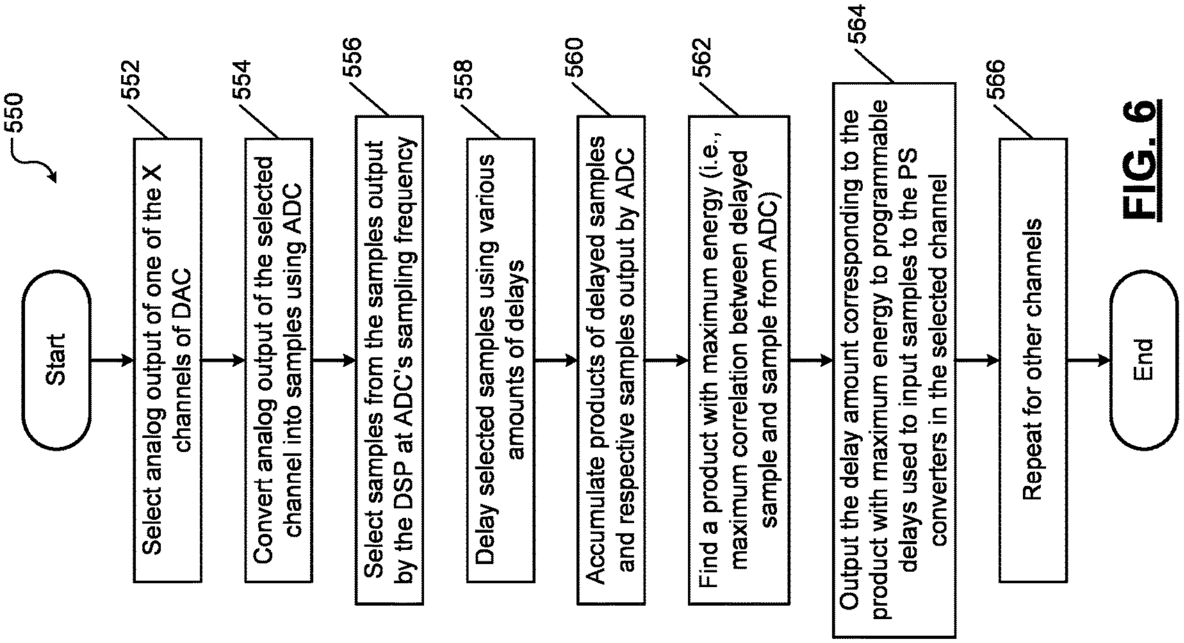
FIG. 6 shows a method for synchronizing the multiple channels of a high-speed DAC using a control loop according to the present disclosure.
Figure 5:
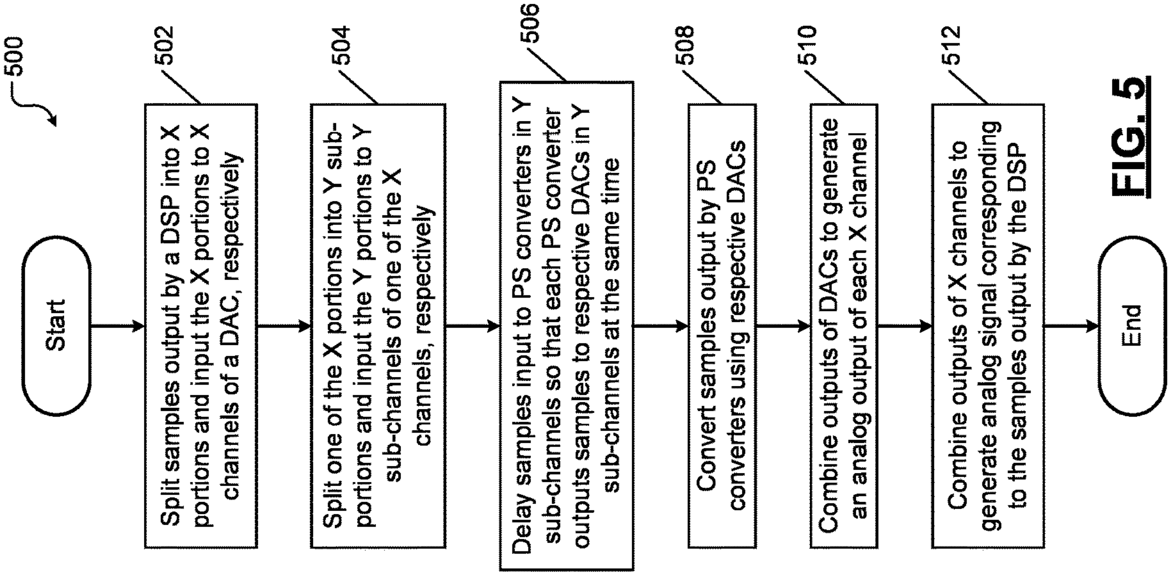
FIG. 5 shows a flowchart of a method for converting a digital output of a digital signal processor (DSP) into an analog signal using a high-speed DAC comprising multiple channels according to the present disclosure.

FIGS. 4A-4D show various configurations of a high-speed DAC. FIG. 4A shows a configuration in which multiple channels 104 such as those shown in FIG. 1 are used to convert an output of the digital signal processor (DSP) 204. FIG. 4B shows a configuration in which the high-speed DAC uses a single channel that is subdivided into multiple sub-channels and uses a single control loop to synchronize all the sub-channels. FIG. 4C shows a configuration in which the high-speed DAC uses a single channel that is subdivided into multiple sub-channels, uses one control loop to synchronize a first pair of the sub-channels, and uses another control loop to synchronize a second pair of sub-channels. FIG. 4D shows a configuration in which the high-speed DAC uses a single channel that is subdivided into multiple sub-channels and uses individual control loops to synchronize the respective sub-channels. These configurations are described below in detail. Further, FIGS. 5 and 6 show methods for converting a digital output of a DSP into an analog signal using a high-speed DAC comprising multiple channels and for synchronizing the multiple channels of the high-speed DAC using a control loop.

FIG. 4A shows an example of one channel (e.g., the channel 104 shown in top portion of FIG. 1) of a high-speed DAC 400 and the control loop 112 (shown in FIGS. 1 and 2, also called a calibration loop) for the high-speed DAC 400. The DAC 400 can comprise multiple such channels (e.g., four channels shown at 104 in FIG. 1). The control loop 112 is shared by and is common to all the channels 104 of the DAC 400. The control loop 112 controls all the channels 104 of the DAC 400 as described below with reference to one channel 104.

For example, the channel 104 comprises four sub-channels 402, 404, 406, 408 and a combiner 410. Each sub-channel comprises a programmable delay, a PS converter, and a DAC. For example, the sub-channel 402 comprises a programmable delay 412, a PS converter 414, and a DAC 416. The sub-channel 404 comprises a programmable delay 422, a PS converter 424, and a DAC 426. The sub-channel 406 comprises a programmable delay 432, a PS converter 434, and a DAC 436. The sub-channel 408 comprises a programmable delay 442, a PS converter 444, and a DAC 446.

The control loop 112 comprises the MUX shown at 116 and 224 in FIGS. 1 and 2 (which is shown in FIG. 4 at 450 and hereinafter called the MUX 450), the ADC 224 (also shown in FIGS. 1 and 2), a sampling circuit 460, a delay circuit 462, and a correlator 464. The sampling circuit 460, the delay circuit 462, and the correlator 464 correspond to the latency calibrator 124 shown in FIGS. 1 and 2. The DSP 204 outputs samples to the DAC 400 comprising multiple channels. While only one channel 104 is shown in FIG. 4, the DAC 400 can comprise multiple channels 104 as shown in FIG. 1.

The MUX 450 is used only to serve the purpose of calibration described below so that all latency components associated with the PS converters in the channels are observed using a single time reference. Alternatively, each channel can have its own ADC 224 and latency calibrator 124 (see FIG. 4D) in which case the MUX 450 is unnecessary and can be omitted. In this arrangement, it is necessary to establish the common time reference for the latency measurement. Accordingly, in some examples, while not shown, each channel may use a respective control loop, in which case, the multiplexer 450 is unnecessary and can be omitted. In still other examples, a first pair of channels may share one control loop, and a second pair of channels may share another control loop (see FIG. 4C), in which case each control loop may use a two-to-one multiplexer. In these examples, where multiple control loops are used instead of a single control loop to synchronize multiple channels, the multiple control loops are synchronized using the same clock signal input to the ADCs in the control loops. The synchronization can be easily achieved since the clock signal input to the ADCs is slower than the clock signal used by the DACs in the channels.

The samples output by the DSP 204 are split into multiple portions that are input to the multiple channels, respectively (e.g., see channels 104 shown in FIG. 1). One portion of the samples is input to the channel 104. Other portions of the samples are input to other channels (e.g., three more channels shown at 104 FIG. 1). All portions of the samples are input to the respective channels in parallel. The other channels process the other portions of the samples output by the DSP 204 in parallel with the channel 104 and in the same manner as the channel 104, which is described below.

In the configuration shown in FIG. 4A, the MUX 450 of the control loop 112 is connected to the combiner 410 in each channel (e.g., see elements 410 present in each channel shown in FIG. 1). The MUX 450 selects output of each channel (i.e., output of the combiner 410 in each channel), and the control loop 112 controls the programable delays in all the channels as described below with reference to one channel. The channel 104 processes the portion of the samples received from the DSP 204 under the control of the control loop 112 as follows.

For example, in the channel 104, the portion of the samples output by the DSP 204 is divided into four sub-portions. While four sub-portions are shown as an example, any suitable number of sub-portions may be used instead. Further, when the high-speed DAC 400 does not use multiple channels 104 and yet the output of the DSP 204 is split into multiple portions (see FIG. 4B), each subchannel (e.g., 402, 404, 406, 408) of the channel 104 can process respective portions of the output of the DSP 204 and can be simply called a channel instead. In such a configuration, if a single control loop 112 is used, the MUX 450 receives the outputs of the DACs of each subchannel. If subchannels 402 and 404 share one control loop comprising the ADC and the latency calibrator (one set of elements 224, 124) and subchannels 406 and 408 share another control loop comprising a respective ADC and latency calibrator (another set of elements 224, 124), a 2-1 MUX is used in each control loop, and the control loops are synchronize as described above.

Each sub-portion is input to a respective sub-channel. For example, first, second, third, and fourth sub-portions are input to the sub-channels 402, 404, 406, 408, respectively. In each sub-channel, the respective programmable delay adjusts (i.e., synchronizes) the timing of the samples in the respective sub-portion under the control of the control loop 112 as described below. Each programmable delay receives respective samples from the DSP 204 and outputs the samples to the respective PS converter with the timing of the samples adjusted such that each PS converter outputs all bits of a sample at the same time. That is, due to the timing synchronization of the samples provided by the programmable delays under the control of the control loop 112, each PS converter in the four sub-channels receives and converts samples at the same time. The respective DACs convert the temporally synchronized serial data streams of the samples output by the respective PS converters into an analog output. The DACs 416, 426, 436, 446 operate at a first clock frequency. The combiner 410 combines the analog outputs of the DACs 416, 426, 436, 446 into an analog signal of the channel 104 that represents the portion of the samples output by the DSP 204 to the channel 104.

In the control loop 112, the MUX 450 selects the output of the channel 104 (i.e., the output of the combiner 410 of the channel 104). The ADC 224 converts the analog signal into digital samples. The ADC 224 operates at a second clock frequency that is less than the first clock frequency at which the DACs 416, 426, 436, 446 operate. For example, the second frequency is equal to the first frequency divided by R.

The sampling circuit 460 selects samples from the samples output by the DSP 204 at the second frequency at which the ADC 224 operates. The delay circuit 462 adds various delays to the samples selected by the sampling circuit 460. The correlator 464 multiplies the samples delayed by various amounts of delays and the respective samples output by the ADC 224. The correlator 464 accumulates the products of the samples. The correlator 464 correlates the delayed samples and the respective samples output by the ADC 224. The correlator 464 finds the product having the maximum energy (i.e., maximum correlation). The correlator 464 selects the delay amount corresponding to the product having the maximum energy (i.e., maximum correlation). The correlator 464 outputs the delay amount to the programmable delays in the channel 104. The MUX 450 selects the next channel, the control loop 112 repeats the procedure described above, and the correlator 464 outputs the delay amount to the programmable delays in the next channel. Thus, all the channels 104 of the DAC 400 are synchronized.

FIG. 4B shows a configuration in which the high-speed DAC uses a single channel that is subdivided into multiple sub-channels (e.g., 402, 404, 406, 408, which can be simply called channels) and uses a single control loop 112 to synchronize all the sub-channels. While only four subchannels are shown as an example, any suitable number of subchannels can be used depending on the width of the digital data output by the DSP 204, the resolution of the DACs in each subchannel, and so on. In this configuration, the outputs of the DACs 416, 426, 436, 446 of the subchannels 402, 404, 406, 408 are input to the MUX 450 of the control loop 112. The control loop 112 controls the programmable delays 412, 422, 432, 442 of the subchannels 402, 404, 406, 408 as described above with reference to FIG. 4A to synchronize the PS converters 414, 424, 434, 444 and the DACs 416, 426, 436, 446 of all the subchannels 402, 404, 406, 408 so that the output of the combiner 410 is an analog signal that faithfully represents the digital data output by the DSP 204.

FIG. 4C shows a configuration in which the high-speed DAC uses a single channel that is subdivided into multiple sub-channels (e.g., 402, 404, 406, 408, which can be simply called channels), uses one control loop 112 to synchronize a first pair of the sub-channels 402, 404, and uses another control loop 112 to synchronize a second pair of subchannels 406, 408. While only four subchannels are shown as an example, any suitable number of subchannels can be used depending on the width of the digital data output by the DSP 204, the resolution of the DACs in each subchannel, and so on. In this configuration, the outputs of the DACs 416, 426 of the subchannels 402, 404 are input to the MUX 450 of the first control loop 112 controlling the first pair of the sub-channels 402, 404. The outputs of the DACs 436, 446 of the subchannels 406, 408 are input to the MUX 450 of the second control loop 112 controlling the second pair of the sub-channels 406, 408. The first control loop 112 controls the programmable delays 412, 422 of the first pair of subchannels 402, 404 as described above with reference to FIG. 4A to synchronize the PS converters 414, 424 and the DACs 416, 426 of the first pair of subchannels 402, 404. The second control loop 112 controls the programmable delays 432, 442 of the second pair of subchannels 406, 408 as described above with reference to FIG. 4A to synchronize the PS converters 434, 444 and the DACs 436, 446 of the second pair of subchannels 406, 408. The first and second control loops 112 are also easily synchronized since they operate at lower clock frequencies than the DACs 416, 426, 436, 446 so that the output of the combiner 410, which combines the outputs of the DACs 416, 426, 436, 446, is an analog signal that faithfully represents the digital data output by the DSP 204.

FIG. 4D shows a configuration in which the high-speed DAC uses a single channel that is subdivided into multiple sub-channels (e.g., 402, 404, 406, 408, which can be simply called channels) and uses individual control loops 112 to synchronize the respective sub-channels. While only four subchannels are shown as an example, any suitable number of subchannels can be used depending on the width of the digital data output by the DSP 204, the resolution of the DACs in each subchannel, and so on. In this configuration, the outputs of the DACs 416, 426, 436, 446 of the subchannels 402, 404, 406, 408 are input to the respective control loop 112. Each control loop 112 controls the programmable delays 412, 422, 432, 442 of the subchannels 402, 404, 406, 408, respectively, as described above with reference to FIG. 4A to synchronize the PS converters 414, 424, 434, 444 and the DACs 416, 426, 436, 446 of all the subchannels 402, 404, 406, 408 so that the output of the combiner 410 is an analog signal that faithfully represents the digital data output by the DSP 204. The control loops 112 are also easily synchronized since they operate at lower clock frequencies than the DACs 416, 426, 436, 446 so that the output of the combiner 410, which combines the outputs of the DACs 416, 426, 436, 446, is an analog signal that faithfully represents the digital data output by the DSP 204.

FIG. 5 shows a method 500 for converting a digital output of a DSP into an analog signal using a high-speed DAC comprising multiple channels according to the present disclosure. At 502, the samples output by the DSP are split into X portions, and the X portions are input to X channels of the DAC, respectively. The following steps are performed for each X channel. At 504, one of the X portions input to one of the X channels is further split into Y sub-portions, and the Y sub-portions are input to Y subchannels of the X channel, respectively. At 506, the samples input to PS converters in the Y subchannels are delayed (i.e., the timing of the samples input to the PS converters is adjusted or synchronized) so that each PS converter outputs samples to respective DACs in the Y subchannels of the X channel at the same time. At 508, the DACs in the Y subchannels of the X channel convert the samples into analog signals. At 510, the analog signals are combined to generate an analog output of the X channel that corresponds to the portion of the output of the DSP input to the X channel. At 512, the analog outputs of the X channels are combined to generate an analog signal that corresponds to the samples output by the DSP.

FIG. 6 shows a method 550 for synchronizing the multiple channels of the high-speed DAC using a control loop according to the present disclosure. At 552, an analog output of one of the X channels of the high-speed DAC is selected. At 554, the analog output of the selected channel is converted into samples using an ADC, where the ADC uses a clock signal of a lower frequency than the DAC in the channel. At 556, samples are selected from the output of the DSP at the ADC's sampling frequency. At 558, the selected samples are delayed using various amounts of delays. At 560, products of the delayed samples and the corresponding samples output by the ADC are accumulated. At 562, a product with the highest energy (i.e., products with maximum correlation between the delayed sample and the ADC samples) is found. At 564, the amount of delay corresponding to the product with maximum correlation is output to the programmable delays used to input samples from the DSP to the PS converters in the selected channel. At 566, the procedure (steps 552-564) is repeated for other channels to synchronize all the channels so that the output of the high-speed DAC is an analog signal that faithfully represents the output of the DSP.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It is noted that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A high-speed driver for a coherent optical transmitter, the high-speed driver comprising:

multiple channels, each channel configured to combine slices of an electrical signal into an orthogonal component of a coherent light signal to be transmitted by the coherent optical transmitter;

a calibration loop configured to measure a respective latency of each of the slices of the electrical signal, wherein the calibration loop comprises:

a multiplexer coupled to outputs of the multiple channels and is configured to select and output a signal corresponding to a selected slice of one of the multiple channels; and an analog-to-digital converter (ADC) coupled to an output of the multiplexer to sample the signal to generate an ADC sample, the ADC being clocked by a frequency that is equal to a clock frequency of the selected slice divided by R, wherein R is rational multiple of a number of slices in the one of the multiple channels; and a plurality of programmable delays configured to (i) receive the respective latency of each of the slices and (ii) compensate differences between the respective latency of each of the slices by adjusting respective delays of the slices to combine the outputs of the multiple channels into a single wavelength of the coherent light signal to be transmitted by the coherent optical transmitter.

2. The high-speed driver of claim 1, wherein the calibration loop further comprises a latency calibrator configured to calibrate a latency variable l that matches a path delay of a slice symbol in the selected slice of one of the multiple channels.

3. The high-speed driver of claim 2, further comprising a subsample component configured to sample the slice symbol, and a ratio tracker configured to determine which slice symbol is valid by tracking a ratio of frequencies of a digital to analog converter used to generate an analog signal for each channel and the analog to digital converter used to sample the analog signal.

4. The high-speed driver of claim 3, further comprising a delay component configured to match the path delay of the slice symbol with the latency variable l.

5. The high-speed driver of claim 4, further comprising an accumulator configured to accumulate a set of l on each of the ADC sample and find a value of l that is highest among the set of l and to calculate a latency of each of the slices based on the value of l.

6. The high-speed driver of claim 5, wherein the programmable delays are configured to compensate the differences between the respective latency of each of the slices to equalize delays of the slice symbols and achieve channel synchronization.

7. The high-speed driver of claim 1, wherein the calibration loop further comprises a separate ADC for each of the multiple channels and each of the ADCs is configured to sample one signal separately from each of the multiple channels to separately output a respective ADC sample at a substantially same sampling time.

8. A coherent optical module comprising:

the coherent optical transmitter comprising the high-speed driver of claim 1 for channel synchronization;

wherein the high-speed driver is cascaded by multiple channels, each channel combining multiple electrical signals respectively through multiple parallel slices onto the orthogonal component of the coherent light signal to be transmitted by the coherent optical transmitter; and wherein the multiple parallel slices are coupled to a digital signal processor to respectively receive multiple parallel state signals with respective latency delays synchronized before merged into a parallel-to-serial conversion circuit to generate a serial state signal converted to an analog signal via a digital-to-analog converter (DAC) for generating an optical symbol per channel.

9. The coherent optical module of claim 8 further comprising a phase rotator in a control loop to adjust a clock phase to each channel for further matching channel latency from an electrical signal path to the coherent optical transmitter to compensate module level mismatch.

10. A high-speed digital to analog converter circuit comprising:

a plurality of channels, each channel receiving a portion of digital data to be converted into analog format, each channel comprising:

a programmable delay configured to delay samples in a corresponding portion according to a delay value;

a parallel to serial converter configured to convert the samples received from the programmable delay into serial data streams; and a digital to analog converter configured to convert the serial data streams received from the parallel to serial converter into an analog signal;

a control loop connected between the digital to analog converters and the programmable delays, the control loop configured to output the delay values to the programmable delays to synchronize outputs of the parallel to serial converters;

wherein the control loop comprises:

a multiplexer coupled to outputs of the plurality of channels and is configured to select and output a signal corresponding to a selected slice of one of the plurality of channels; and an analog-to-digital converter (ADC) coupled to an output of the multiplexer to sample the signal to generate an ADC sample, the ADC being clocked by a frequency that is equal to a clock frequency of the selected slice divided by R, wherein R is rational multiple of a number of slices in the one of the plurality of channels; and a combiner configured to combine the analog signals from the digital to analog converters to generate an output signal representing the digital data.

11. The high-speed digital to analog converter circuit of claim 10, wherein the control loop further comprises a latency calibrator configured to calibrate a latency variable l that matches a path delay of a slice symbol in the selected slice of one of the plurality of channels.

12. The high-speed digital to analog converter circuit of claim 11, further comprising a subsample component configured to sample the slice symbol, and a ratio tracker configured to determine which slice symbol is valid by tracking a ratio of frequencies of the digital to analog converter used to generate an analog signal for each channel and the analog to digital converter used to sample the analog signal.

13. The high-speed digital to analog converter circuit of claim 12, further comprising a delay component configured to match the path delay of the slice symbol with the latency variable l.

14. The high-speed digital to analog converter circuit of claim 13, further comprising an accumulator configured to accumulate a set of l on each of the ADC sample and find a value of l that is highest among the set of l and to calculate a latency of each of the slices based on the value of l.

15. The high-speed digital to analog converter circuit of claim 14, wherein the programmable delays are configured to compensate differences between the respective latency of each of the slices to equalize delays of the slice symbols and achieve channel synchronization.

16. The high-speed digital to analog converter circuit of claim 10, wherein the control loop further comprises a separate ADC for each of the plurality of channels and each of the ADCs is configured to sample one signal separately from each of the plurality of channels to separately output a respective ADC sample at a substantially same sampling time.

17. A coherent optical module comprising:

a coherent optical transmitter comprising the high-speed digital to analog converter circuit of claim 10 for channel synchronization;

wherein the high-speed digital to analog converter circuit is cascaded by multiple channels, each channel combining multiple electrical signals respectively through multiple parallel slices onto an orthogonal component of a coherent light signal to be transmitted by the coherent optical transmitter; and wherein the multiple parallel slices are coupled to a digital signal processor to respectively receive multiple parallel state signals with respective latency delays synchronized before merged into a parallel-to-serial conversion circuit to generate a serial state signal converted to an analog signal via a digital-to-analog converter (DAC) for generating an optical symbol per channel.

18. The coherent optical module of claim 17 further comprising a phase rotator in the control loop to adjust a clock phase to each channel for further matching channel latency from an electrical signal path to the coherent optical transmitter to compensate module level mismatch.

* * * * *